(12) United States Patent
Martin et al.

(10) Patent No.: US 8,255,525 B2
(45) Date of Patent: Aug. 28, 2012

(54) SYSTEM AND METHOD FOR CIRCUIT AND PATH BASED EVENT CORRELATION

(75) Inventors: Daniel Joseph Martin, Pawling, NY (US); Philip Brian McMahon, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/543,834

(22) Filed: Aug. 19, 2009

(65) Prior Publication Data

US 2011/0047262 A1 Feb. 24, 2011

(51) Int. Cl.
G06F 15/173 (2006.01)
G06F 17/30 (2006.01)
G06F 11/00 (2006.01)

(52) U.S. Cl. .............................. 709/224; 714/4.1
(58) Field of Classification Search ................ 709/224; 714/4.1
See application file for complete search history.

(56) References Cited

U.S. PATENT DOCUMENTS

| | | | |
|---|---|---|---|
| 6,414,595 B1 | 7/2002 | Scrandis et al. | |
| 6,481,005 B1 | 11/2002 | Crowley et al. | |
| 6,671,818 B1 | 12/2003 | Mikurak | |
| 6,735,436 B1 | 5/2004 | McCauley et al. | |
| 8,108,725 B2 * | 1/2012 | Chan | 714/26 |
| 8,117,487 B1 * | 2/2012 | Raut et al. | 714/4.11 |
| 2002/0111755 A1 | 8/2002 | Valadarsky et al. | |
| 2005/0015685 A1 * | 1/2005 | Yamamoto | 714/54 |
| 2005/0172162 A1 * | 8/2005 | Takahashi et al. | 714/4 |
| 2005/0228763 A1 | 10/2005 | Lewis et al. | |
| 2008/0225857 A1 * | 9/2008 | Lange | 370/395.5 |
| 2009/0279551 A1 * | 11/2009 | Wong et al. | 370/395.53 |

OTHER PUBLICATIONS

European Patent Office, PCT International Search Report and Written Opinion of the ISR, issued Sep. 10, 2010, 12 pgs.

* cited by examiner

*Primary Examiner* — Wing Chan
*Assistant Examiner* — Kostas Katsikis
(74) *Attorney, Agent, or Firm* — Hamilton & Terrile, LLP; Stephen A. Terrile

(57) ABSTRACT

A method, system and computer-usable medium are disclosed for the correlation of network events. A port of a network device is monitored at the physical layer interface for the occurrence of a network event. If detected, a repository of circuit path, network device, and device interface data is queried for information related to the network event and each network device at each hop of the circuit path associated with the event. A user selects time intervals for other network events or alarms occurring before or after the target event. A repository of network event and alarm data is then queried to retrieve all network events or alarms occurring during the selected time interval. Information related to the network events or alarms are then compared to interfaces related to devices that are likewise associated with the circuit path associated with the event.

17 Claims, 4 Drawing Sheets

SYSTEM AND METHOD FOR CIRCUIT AND PATH BASED EVENT CORRELATION

BACKGROUND OF THE INVENTION

1. Field of the Invention

Embodiments of the disclosure relate in general to the field of computers and similar technologies, and in particular to software utilized in this field. Still more particularly, it relates to method, system and computer-usable medium for the correlation of network events.

2. Description of the Related Art

The demand for increased network speeds and bandwidth by consumers, businesses, and government continues to increase. As a result, the use of, Synchronous Optical Networking (SONET) and Synchronous Digital Hierarchy (SDH) technologies in today's networks is becoming commonplace. These networks, based on optical technologies, are capable of delivering large amounts of bandwidth. As an example, an Optical Carrier 3 (OC3) circuit can deliver data transmission speeds of 155 Megabits/second, while an OC192 circuit can deliver 10 Gigabits/second.

However, the size, speed, diversity, and complexity of these networks create corresponding challenges in their effective management. Furthermore, these networks are becoming increasingly interconnected, which creates additional challenges. As an example, a link failure in a SONET/SDH network may cause multiple sympathetic network events or alarms to emanate from circuits that have upper layer time slots. These network events or alarms can likewise result from the ingress and egress of each time slot of each circuit. As an example, an Optical Carrier 3 (OC3) failure occurring in a circuit can cause network management alarms to emanate from each of the three Digital Signal 3 (DS3) time slots on each side of the circuit. As a result, sympathetic network events and alarms emanate from affected devices and circuits along the path.

Determining which of these network events and alarms is associated with a root cause of a network issue can prove problematic. Current approaches to managing lower layer events include suppressing the sympathetic events that occur for time slots and terminations affected by the event. In other approaches for the management of router and switch-based networks, there are times when the path between two points can be known with certainty. The challenge is to then connect the events along a path to any lower lying event that might have caused the problem. However, there is no current solution for correlating these events.

BRIEF SUMMARY OF THE INVENTION

The present invention includes, but is not limited to, a method, system and computer-usable medium for the correlation of network events. In various embodiments, an event correlation module is implemented with a network management system to perform event correlations of network events or alarms. In these and other embodiments, a Synchronous Optical Networking (SONET) or Synchronous Digital Hierarchy (SDH) port of a network device is monitored for the occurrence of a loss of signal (LOS) or a loss of frame (LOF) event. Likewise in these embodiments, the monitoring of the SONET/SDH port is at the physical layer interface, not a time slot.

If a LOS/LOF network event is detected, then a repository of circuit path, network device, and device interface data is queried for information related to the LOS/LOF network event. The repository is likewise queried for information related to each network device at each hop of the circuit path associated with the LOS/LOF network event. In various embodiments, a user of the event correlation module selects time intervals for other network events or alarms occurring before or after the target LOS/LOF network event. A repository of network event and alarm data is then queried to retrieve all network events or alarms occurring during the selected time interval. In various embodiments, the queries are performed by the event correlation module.

Information related to the network events or alarms occurring during the selected time interval are then compared to interfaces related to devices that are likewise associated with the circuit path associated with the LOS/LOF network event. In one embodiment, if the network event or alarm occurring within the selected time interval does not match the interface, then it is associated as a child network event of the LOS/LOF network event. In another embodiment, the foregoing process is likewise followed for network path query events. However, if the network event or alarm occurring within the selected time interval matches the interface, then it is associated as a parent network event of a network path query event. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
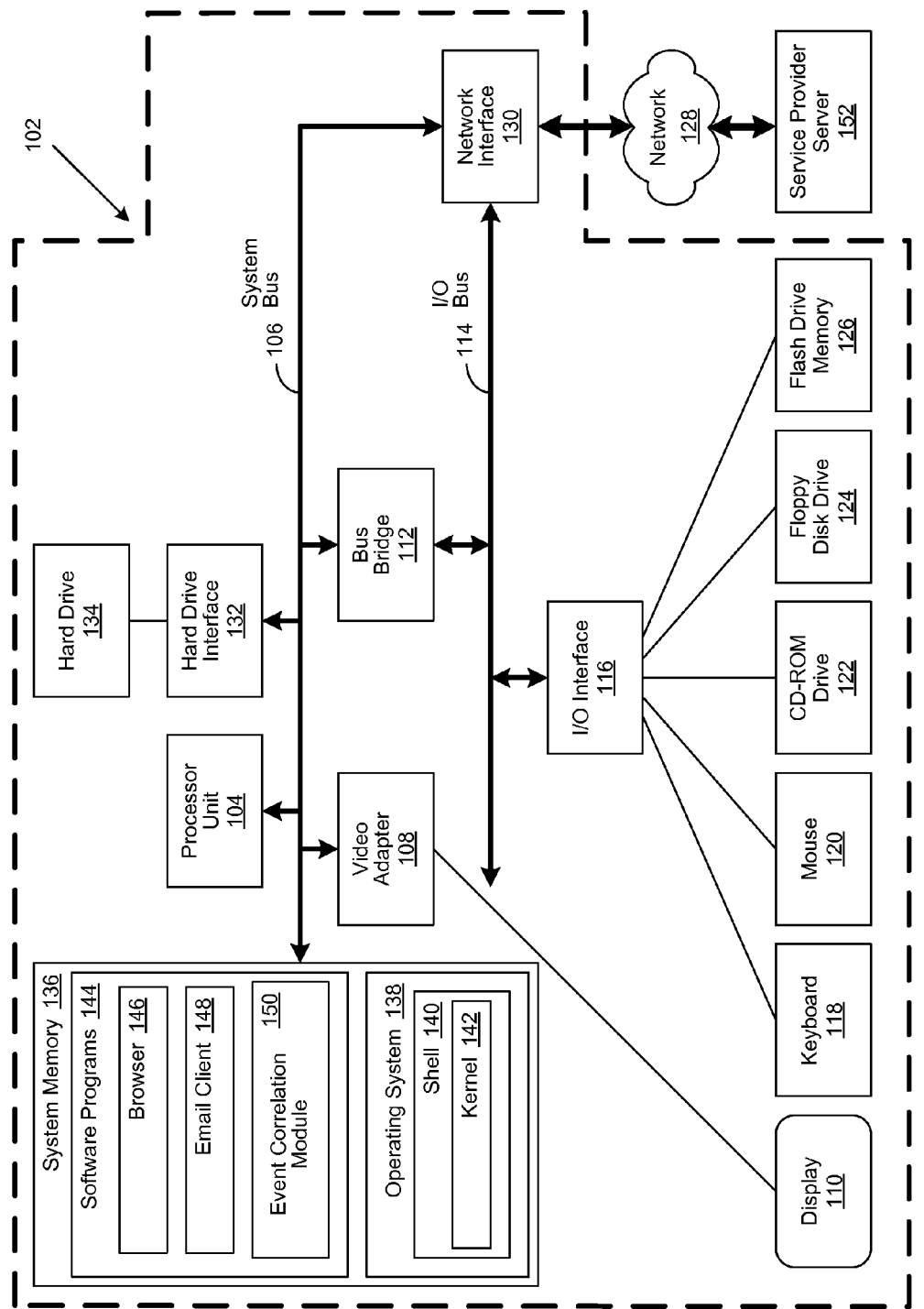
FIG. 1 depicts an exemplary client computer in which the present invention may be implemented.

A method, system and computer-usable medium are disclosed for the correlation of network events. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include an event correlation module 150. The event correlation module 150 includes code for implementing the processes described in FIGS. 2 through 4 described hereinbelow. In one embodiment, client computer 102 is able to download the event correlation module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
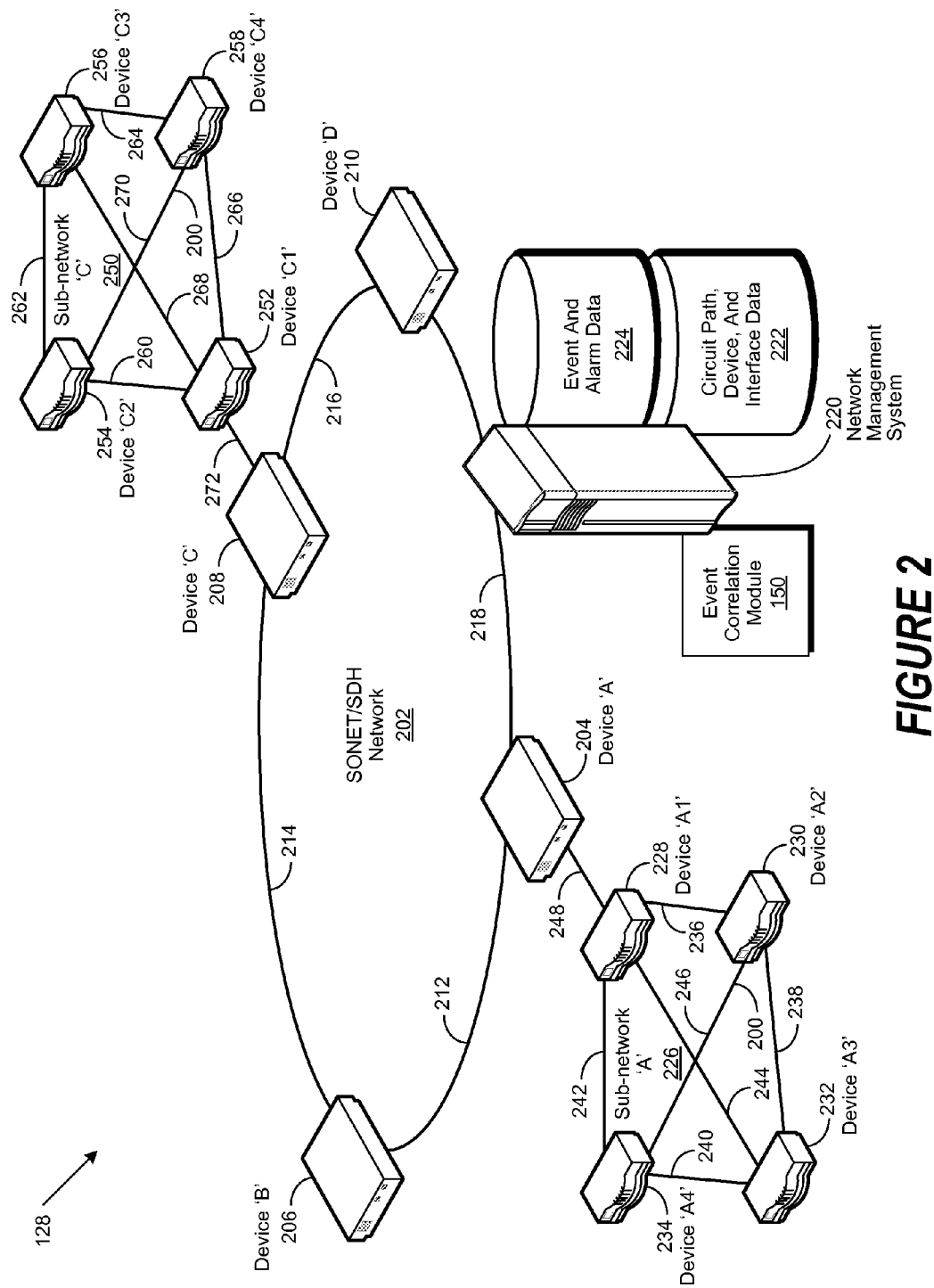
FIG. 2 is a simplified block diagram of an event correlation module as implemented in an embodiment of the invention.

FIG. 2 is a simplified block diagram of an event correlation module as implemented in an embodiment of the invention. In this embodiment, network 128 comprises a network 202 implemented with the Synchronous Optical Networking (SONET) or Synchronous Digital Hierarchy (SDH) multiplexing protocols. Network 128 further comprises a network management system 220, sub-network 'A' 226 and sub-network 'C' 250. The network management system further comprises an event correlation module 150, a repository of circuit path, device, and interface data 222, and a repository of event and alarm data 224. The SONET/SDH network 202 further comprises SONET/SDH network devices 'A' 204, 'B' 206, 'C' 208, and 'D' interconnected by circuits 212, 214, 216, and 218. The sub-network 'A' 226 further comprises network devices 'A1' 228, 'A2' 230, 'A3' 232, and 'A4' 234, interconnected by circuits 236, 238, 240, 242, 244, and 246. The sub-network 'C' 250 further comprises network devices 'C1' 252, 'C2' 254, 'C3' 256, and 'C4' 258, interconnected by circuits 260, 262, 264, 266, 268, and 270. As shown in FIG. 2, sub-network 'A' 226 is connected to the SONET/SDH network 202 via circuit 248 between device 'A1' 228 and device 'A' 204. As likewise shown in FIG. 2, sub-network 'C' 250 is connected to the SONET/SDH network 202 via circuit 272 between device 'C1' 252 and device 'C' 208

Knowledgeable practitioners of the art are aware that a link failure in a SONET/SDH network 202 may cause multiple sympathetic network events or alarms to emanate from circuits that have upper layer time slots. These network events or alarms can likewise result from the ingress and egress of each time slot of each circuit. As an example, a an Optical Carrier 3 (OC3) failure occurring in circuit 213 can cause network management alarms to emanate from each of the three Digital Signal 3 (DS3) time slots on each side of the circuit 213. As a result, sympathetic network events and alarms emanate from affected devices and circuits along the path. As an example, a network path originates at device 'A3', traverses circuit 240 to device 'A4' 234, and then traverses circuit 242 to device 'A1' 228, and then continues on via circuit 248 to device 'A' 204. Once on the SONET/SDH network 202, the network path traverses circuit 212 to device 'B' 202, followed by traversing circuit 214 to device 'C' 208, where it traverses circuit 272 to device 'C1' 252. The network path then traverses circuit 260 to device 'C2' 254, where it traverses circuit 262 to terminate at device 'C3' 256. Should an OC3 failure occur at circuit 213, it is apparent that network events and alarms will emanate from all devices and circuits along the network path unless they are suppressed by the network management system 220. However, determining which of the network events or alarms are the source cause, or "parent," versus sympathetic, or "child" can prove challenging.

In various embodiments, an event correlation module 150 is implemented to perform event correlations to determine which network events or alarms are parents and which ones are children. In these and other embodiments, a SONET/SDH port of a network device 204, 206, 208, 210 is monitored for the occurrence of a loss of signal (LOS) or a loss of frame (LOF) event. Likewise in these embodiments, the monitoring of the SONET/SDH port is at the physical layer interface, not a time slot. If a LOS/LOF network event is detected, then a repository 222 of circuit path, network device, and device interface data is queried for information related to the LOS/LOF network event is queried. Next, the repository 222 is queried for information related to each network device at each hop of the circuit path associated with the LOS/LOF network event. To use the prior example, network devices in the circuit path would include network devices 232, 234, 228, 204, 206, 208, 252, 254, and 256. In various embodiments, a user of the event correlation module 150 selects time intervals for other network events or alarms occurring before or after the target LOS/LOF network event. A repository 224 of network event and alarm data is then queried to retrieve all network events or alarms occurring during the selected time interval. In various embodiments, the queries are performed by the event correlation module 150 of the network management system 220.

Information related to the network events or alarms occurring during the selected time interval are then compared to interfaces related to devices (e.g., network devices 232, 234, 228, 204, 206, 208, 252, 254, and 256) that are likewise associated with the circuit path associated with the LOS/LOF network event. In one embodiment, if the network event or alarm occurring within the selected time interval does not match the interface, then it is associated as a child network event of the LOS/LOF network event. In another embodiment, the foregoing process is likewise followed for network path query events. However, if the network event or alarm occurring within the selected time interval matches the interface, then it is associated as a parent network event of a network path query event.

Figure 3:
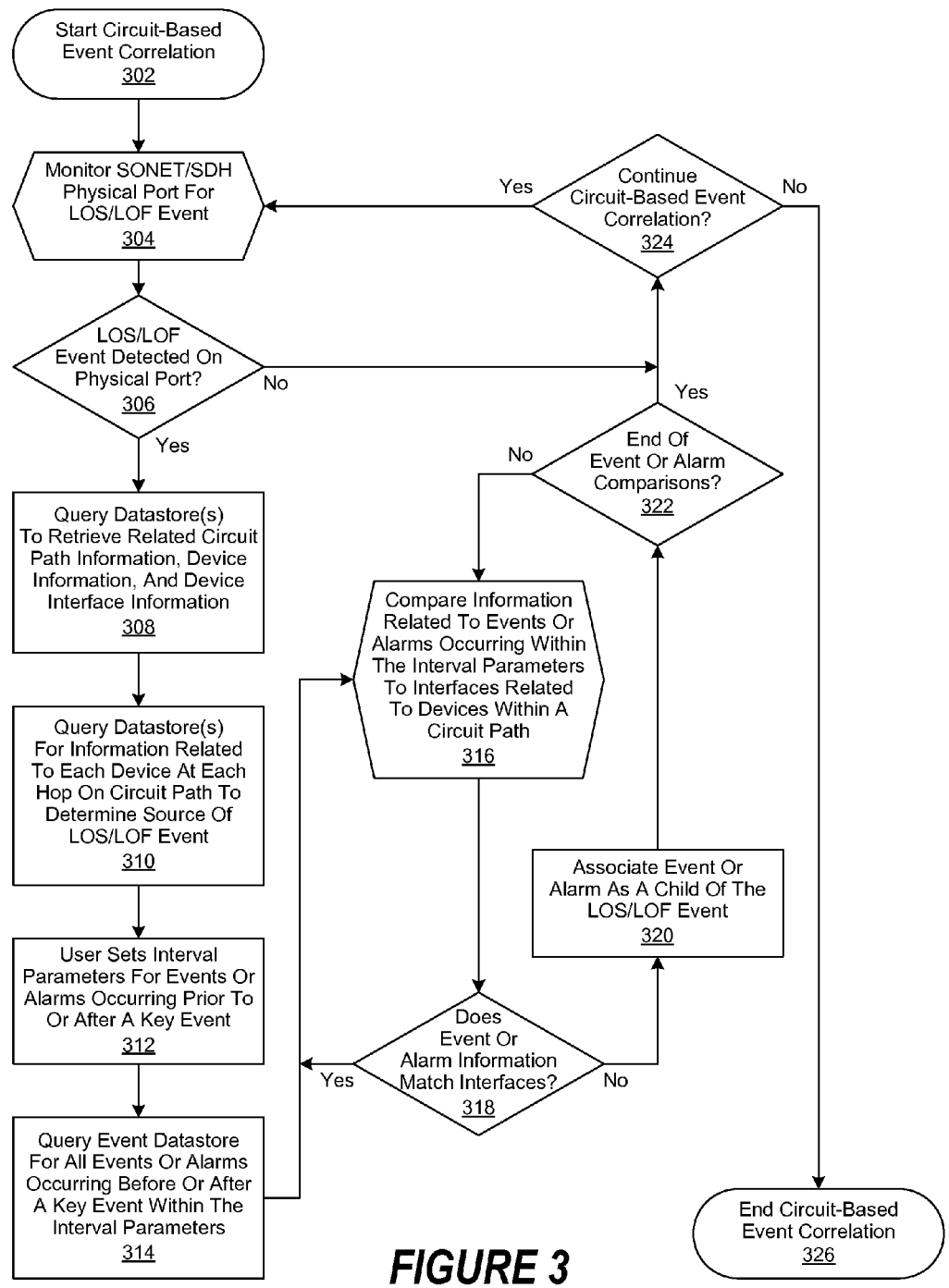
FIG. 3 is a flow chart of the operation of an event correlation module as implemented for the correlation of child events in a network.

FIG. 3 is a flow chart of the operation of an event correlation module as implemented in an embodiment of the invention for the correlation of child events in a network. In this embodiment, circuit-based event correlation is begun in step 302, followed by the monitoring of a Synchronous Optical Networking (SONET)/Synchronous Digital Hierarchy (SDH) port of a network device for the occurrence of a loss of signal (LOS) or a loss of frame (LOF) event. Likewise in this embodiment, the monitoring of the SONET/SDH port is at the physical layer interface, not a time slot. A determination is then made in step 306 whether a LOS/LOF network event is detected on the physical port of the network device. If not, a determination is made in step 324 whether to continue circuit-based event correlation. If so, then the process continues, proceeding with step 304. Otherwise, circuit-based event correlation is ended in step 326.

However, if it is determined in step 306 that a LOS/LOF network event is detected, then a repository (e.g., one or more datastores) of network data is queried in step 308 to retrieve circuit path, network device, and device interface information related to the LOS/LOF network event. Next, the repository of network data is queried in step 310 for information related to each network device at each hop of the circuit path associated with the LOS/LOF network event. Those of skill in the art will realize that when a network device is managed using Simple Network Management Protocol (SNMP), the lowest Internet Protocol (IP) address associated with the network device is returned from the network device interface with the network event. Typically, the lowest IP address does not necessarily correspond to the IP address of the loopback interface, which how most network devices are identified to a network management system. Skilled practitioners of the art will likewise realize that certain SONET/SDH network devices in a ring may act as a gateway for other switches. Accordingly, knowing that a particular network event is associated with a network device that is likewise associated with the circuit path is advantageous for event correlation.

In step 312, a user selects time intervals for other network events or alarms occurring before or after the target LOS/LOF network event. In step 314, a repository (e.g., one or more datastores) of network event and alarm data is queried to retrieve all network events or alarms occurring during the selected time interval. In various embodiments, the queries are performed by an event correlation module of a network management system. In step 416, information related to the network events or alarms occurring during the selected time interval are compared to interfaces related to devices that are likewise associated with the circuit path associated with the LOS/LOF network event. A determination is then made in step 318 whether an individual network event or alarm matches the interfaces. If so, then the process continues, proceed with step 316. Otherwise, the network event or alarm occurring within the selected time interval is associated as a child network event of the LOS/LOF network event in step 320. The child network event is then suppressed. Otherwise, the network event is designated as a parent network event. It will be apparent to skilled practitioners of the art that if the child network events were not suppressed, then an "event storm" could occur, making it difficult to determine the originating parent network event. A determination is then made in step 322 whether network event or alarm comparisons are completed. If not, the process continues, proceeding with step 316. Otherwise, the process continues, proceeding with step 324.

Figure 4:
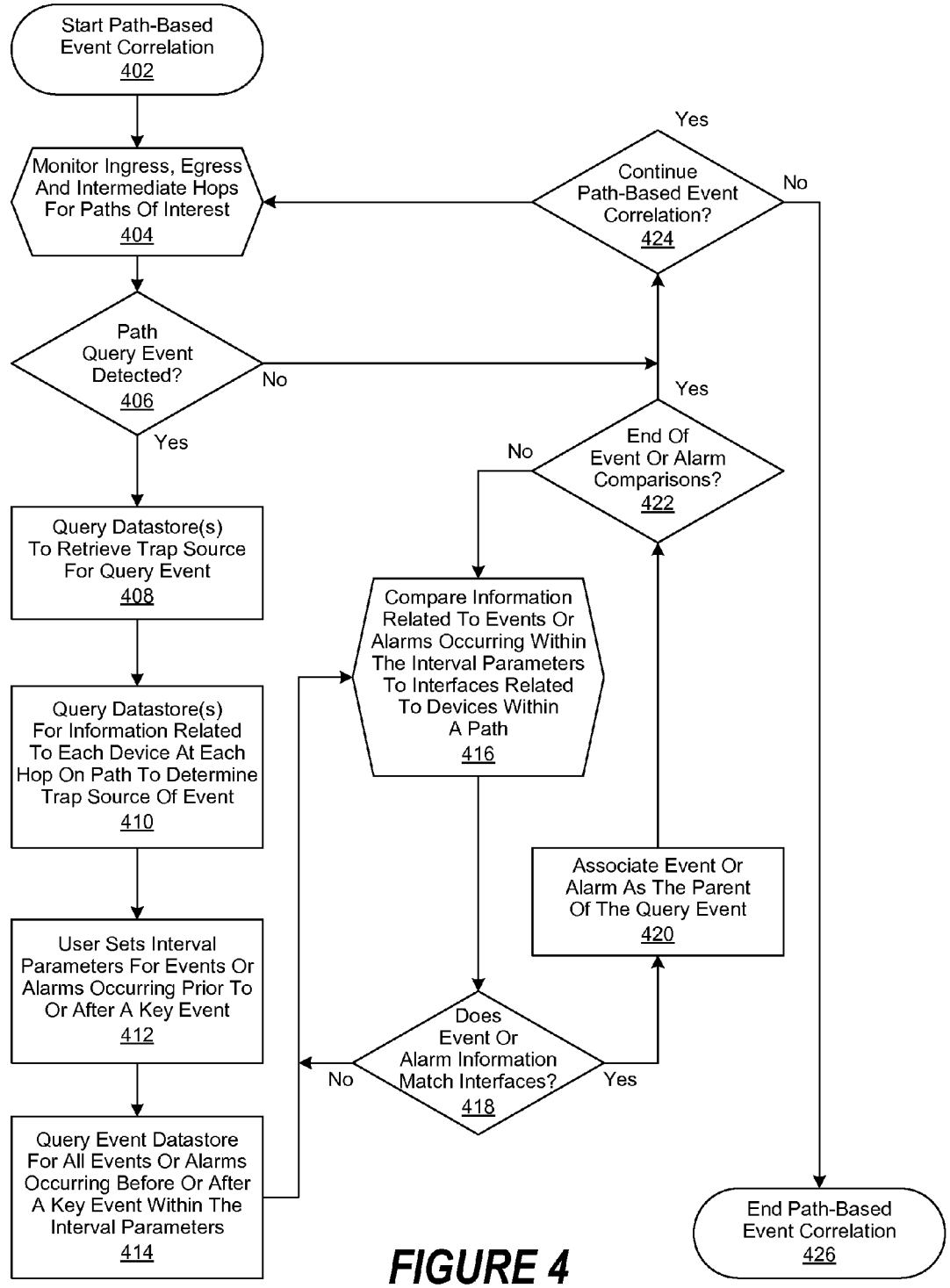
FIG. 4 is a flow chart of the operation of an event correlation module as implemented for the correlation of parent events in a network.

FIG. 4 is a flow chart of the operation of an event correlation module as implemented in an embodiment of the invention for the correlation of parent events in a network. In this embodiment, path-based event correlation is begun in step 402, followed by the monitoring of ingress, egress, and intermediate hops of interest along a network path in step 404. A determination is then made in step 406 whether a network path query event is detected. If not, a determination is made in step 424 whether to continue path-based event correlation. If so, then the process continues, proceeding with step 404. Otherwise, circuit-based event correlation is ended in step 426. However, if it is determined in step 406 that a network path query event has been detected, then a repository (e.g., one or more datastores) of network data is queried in step 408 to retrieve circuit path, network device, and device interface information related to the network path query event. Next, the repository of network data is queried in step 410 for information related to each network device at each hop of the circuit path to determine the trap source of the network path query event.

In step 412, a user selects time intervals for other network events or alarms occurring before or after the target network path query event. In step 414, a repository (e.g., one or more datastores) of network event and alarm data is queried to retrieve all network events or alarms occurring during the selected time interval. In various embodiments, the queries are performed by an event correlation module of a network management system. In step 416, information related to the network events or alarms occurring during the selected time interval are compared to interfaces related to devices that are likewise associated with the circuit path associated with the network path event. A determination is then made in step 418 whether an individual network event or alarm matches the interfaces. If not, then the process continues, proceed with step 416. Otherwise, the network event or alarm occurring within the selected time interval is associated as a parent network event of the network path query event in step 420. A determination is then made in step 422 whether network event or alarm comparisons are completed. If not, the process continues, proceeding with step 416. Otherwise, the process continues, proceeding with step 424.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for event correlation, comprising:
  performing, via a processor, a lookup of network devices, the lookup being performed on network devices interfacing with network events associated with a network circuit within a predetermined period of time;
  matching, via the processor, events based on predetermined criteria to generate a set of matched events;
  making, via the processor, at least one member of the set of matched events a child network event;

processing, via the processor, the network events to identify a probable parent network event, wherein the probable parent network event is not a member of the set of matched events, wherein the parent network event is associated with a network path; and the child network event is associated with a network circuit.

2. The method of claim 1, wherein the performing a lookup and the matching events are performed by an event correlation module of a network management system.

3. The method of claim 1, wherein the network events occur in a network using the Synchronous Optical Networking (SONET) protocol or the Synchronous Digital Hierarchy protocol.

4. The method of claim 1, wherein information related to the network devices is stored in a repository of path, network device, and device interface data.

5. The method of claim 1, wherein the predetermined period of time is selectable by a user.

6. A system comprising:
a processor;
a data bus coupled to the processor; and
a computer-usable medium embodying computer program code, the computer-usable medium being coupled to the data bus, the computer program code used for performing event correlation and comprising instructions executable by the processor and configured for:
performing a lookup of network devices, the lookup being performed on network devices interfacing with network events associated with a network circuit within a predetermined period of time; and
matching events based on predetermined criteria to generate a set of matched events;
making at least one member of the set of matched events a child network event; and
processing the network events to identify a probable parent network event, wherein the probable parent network event is not a member of the set of matched events,
wherein the parent network event is associated with a network path; and
the child network event is associated with a network circuit.

7. The system of claim 6, wherein the performing a lookup and the matching events are performed by an event correlation module of a network management system.

8. The system of claim 6, wherein the network events occur in a network using the Synchronous Optical Networking (SONET) protocol or the Synchronous Digital Hierarchy protocol.

9. The system of claim 6, wherein information related to the network devices is stored in a repository of path, network device, and device interface data.

10. The system of claim 6, wherein the predetermined period of time is selectable by a user.

11. A non-transitory computer-usable medium embodying computer program code, the computer program code comprising computer executable instructions configured for:
performing a lookup of network devices, the lookup being performed on network devices interfacing which interface with network events associated with a network circuit within a predetermined period of time; and
matching events based on predetermined criteria to generate a set of matched events;
making at least one members of the set of matched events a child network event; and
processing the network events to identify a probable parent network event wherein the probable parent network event is not a member of the set of matched events,
wherein the parent network event is associated with a network path; and
the child network event is associated with a network circuit.

12. The non-transitory computer usable medium of claim 11, wherein the performing a lookup and the matching events are performed by an event correlation module of a network management system.

13. The non-transitory computer usable medium of claim 11, wherein the network events occur in a network using the Synchronous Optical Networking (SONET) protocol or the Synchronous Digital Hierarchy protocol.

14. The non-transitory computer usable medium of claim 11, wherein information related to the network devices is stored in a repository of path, network device, and device interface data.

15. The non-transitory computer usable medium of claim 11, wherein the predetermined period of time is selectable by a user.

16. The non-transitory computer usable medium of claim 11, wherein the computer executable instructions are deployable to a client computer from a server at a remote location.

17. The non-transitory computer usable medium of claim 11, wherein the computer executable instructions are provided by a service provider to a customer on an on-demand basis.

* * * * *